United States Patent
Fayan

(12) 
(10) Patent No.: US 10,460,712 B1
(45) Date of Patent: Oct. 29, 2019

(54) SYNCHRONIZING PLAYBACK OF A DIGITAL MUSICAL SCORE WITH AN AUDIO RECORDING

(71) Applicant: Avid Technology, Inc., Burlington, MA (US)

(72) Inventor: Randy M. Fayan, Arlington, MA (US)

(73) Assignee: AVID TECHNOLOGY, INC.

(*) Notice: Subject to any disclaimer, the term of this patent is extended or adjusted under 35 U.S.C. 154(b) by 0 days.

(21) Appl. No.: 16/299,520

(22) Filed: Mar. 12, 2019

Related U.S. Application Data

(60) Provisional application No. 62/777,262, filed on Dec. 10, 2018.

(51) Int. Cl.
 *G10H 1/36* (2006.01)
 *G06F 16/683* (2019.01)
 *G10H 1/00* (2006.01)

(52) U.S. Cl.
 CPC ........... *G10H 1/366* (2013.01); *G06F 16/683* (2019.01); *G10H 1/0033* (2013.01); *G10H 1/365* (2013.01)

(58) Field of Classification Search
 CPC ...... G10H 1/366; G10H 1/0033; G10H 1/365; G06F 16/683
 See application file for complete search history.

(56) References Cited

U.S. PATENT DOCUMENTS

| | | | | |
|---|---|---|---|---|
| 5,952,597 A * | 9/1999 | Weinstock | ............... | G10G 3/04 84/477 R |
| 7,157,638 B1 * | 1/2007 | Sitrick | ................. | G09B 15/023 84/477 R |
| 9,601,029 B2 * | 3/2017 | Gebauer | .................. | G10G 1/00 |
| 2003/0188626 A1 * | 10/2003 | Kriechbaum | ........ | G10H 1/0008 84/609 |
| 2016/0071429 A1 * | 3/2016 | Gebauer | .................. | G10G 1/00 84/465 |
| 2017/0110102 A1 * | 4/2017 | Colafrancesco | ....... | G10H 1/361 |

OTHER PUBLICATIONS

Sibelius Reference Guide, Version 2018.11, Sections 1.13—Exporting video files, 2.12—Sibelius | Cloud Sharing, 3.14—Flexi-time and 6.4—Live tempo, Avid Technology, Inc., Nov. 2018.
Pro Tools Reference Guide, Version 9.0, Chapter 31, Beat Detections, pp. 635-657, Avid Technology, Inc., Nov. 2010.
Noteflight Marketplace Provides Instant Self-Publishing and Purchasing of Digital Sheet Music, Noteflight, Danielle Herrera, Nov. 7, 2018, 3 pages.

* cited by examiner

*Primary Examiner* — Jeffrey Donels
(74) *Attorney, Agent, or Firm* — Oliver Strimpel

(57) ABSTRACT

Playback of a graphical representation of a digital musical score is synchronized with an expressive audio rendering of the score that contains tempo and dynamics beyond those specified in the score. The method involves determining a set of offsets for occurrences of score events in the audio rendering by comparing and temporally aligning audio waveforms of successive subclips of the audio rendering with corresponding audio waveforms of successive subclips of an audio rendering synthesized directly from the score. Tempos and dynamics of human performances may be extracted and used to generate expressive renderings synthesized from the corresponding digital score. This enables parties who wish to distribute or share music scores, such as composers and publishers, to allow prospective licensors to evaluate the score by listening to an expressive musical recording instead of a mechanically synthesized rendering.

19 Claims, 6 Drawing Sheets

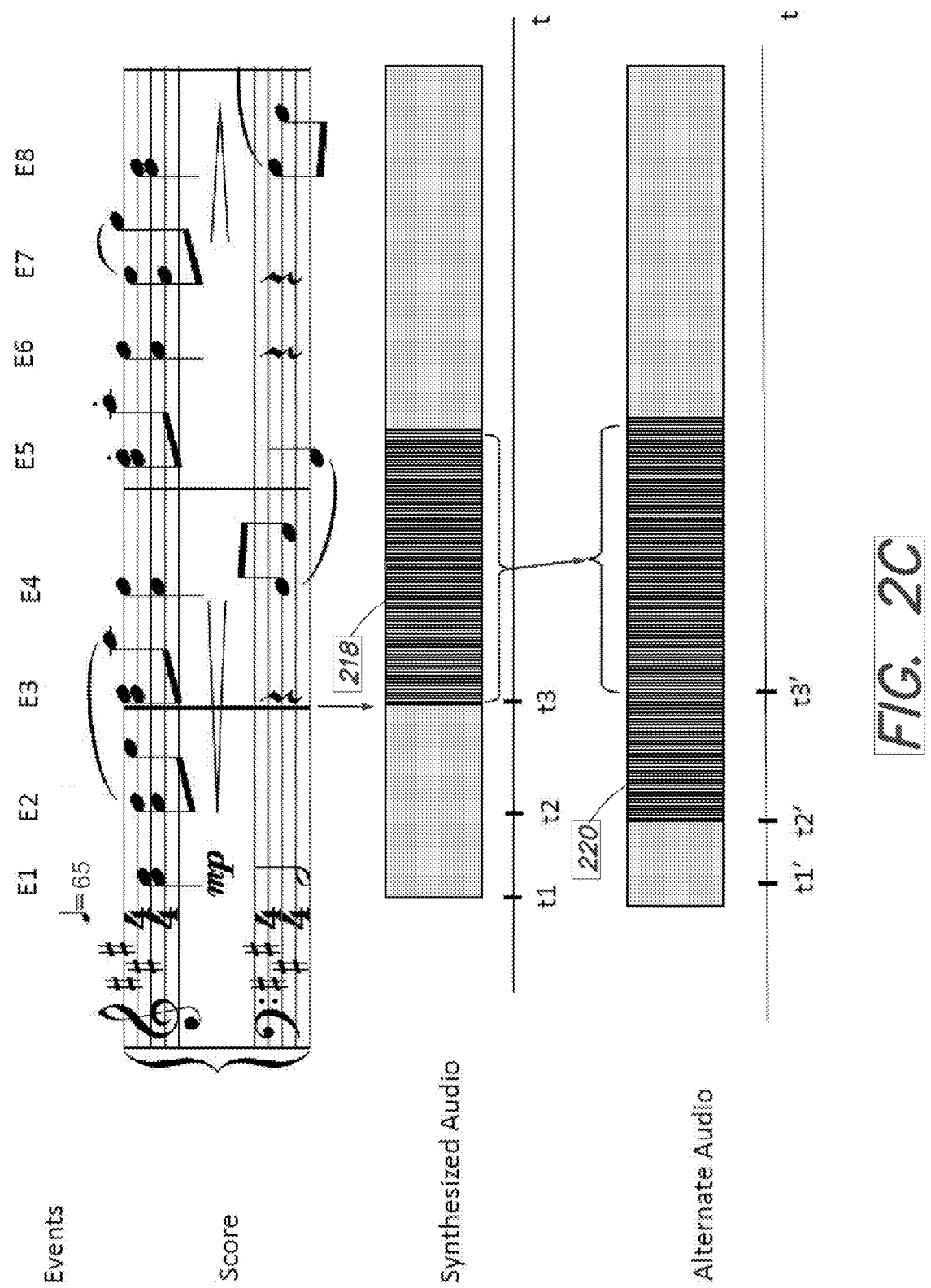

SYNCHRONIZING PLAYBACK OF A DIGITAL MUSICAL SCORE WITH AN AUDIO RECORDING

CROSS REFERENCE TO RELATED APPLICATION

This application claims right of priority to and the benefit under 35 U.S.C. § 119(e) of U.S. provisional patent application Ser. No. 62/777,262, filed Dec. 10, 2018.

BACKGROUND

Appreciation of the music represented by a musical score is facilitated by listening to a performance of the music. The desire to listen to a score commonly arises when a score is published, and a prospective customer wishes to evaluate the music before deciding to purchase, license, or perform the work. A popular feature of certain music notation and music publishing systems is to couple a graphical representation of a score with an audio playback of the score. This is done by displaying the playback position in a graphical display of the score in synchrony with the audio playback of the performance, which assists the listener to follow the music in the score during the playback. Currently available methods only permit such synchronized playback to occur with audio renderings that are generated automatically from a digital score. Such renderings tend to sound robotic and lifeless and fail to do the score justice. There is a need to extend synchronized playback to a wider range of renderings of the score.

SUMMARY

A digital musical score is synchronized with an expressive, musically interpreted audio rendering of the score by comparing an audio rendering synthesized directly from the score using music notation software with the expressive recording to generate a temporal mapping of score events to offsets of occurrences of the score events in the expressive audio recording.

In general, in one aspect, a method of enabling a display of playback location within a graphical representation of a digital musical score in synchrony with playback of an alternate audio rendering of the digital musical score, wherein the digital musical score comprises a plurality of events, and a temporal offset for an occurrence of each of the plurality of events in the alternate audio rendering diverges from a nominal temporal offset for an occurrence of the event as specified in the digital musical score, comprises: receiving a synthesized audio rendering of the digital musical score, wherein the synthesized audio rendering is generated automatically by parsing the digital musical score; receiving the alternate audio rendering of the digital musical score; for each event of the plurality of events: generating a subclip of the synthesized audio rendering starting at the event; generating a sub clip of the alternate audio rendering that is in approximate temporal correspondence with the subclip of the synthesized audio recording; determining an adjusted temporal offset of the subclip of the synthesized audio for which a cross-correlation between the subclip of the synthesized audio rendering and the subclip of the alternate audio rendering is maximized; identifying the adjusted temporal offset as a temporal offset for the occurrence of the event in the alternate audio rendering; and enabling the display of playback location within the graphical representation of the digital musical score in synchrony with playback of the alternate audio rendering of the digital musical score by displaying for each event of the plurality of events a graphical indication of a playback location of the event on a display of the graphical representation of the digital musical score at a playback time corresponding to the identified temporal offset for the occurrence of the event in the alternate audio rendering.

Various embodiments include one or more of the following features. The alternate audio rendering comprises a human performance of the digital musical score. A duration of a given subclip of the synthesized audio rendering spans more than one event of the plurality of events and less than ten events of the plurality of events. The duration of each subclip of the alternate audio rendering that is in approximate temporal correspondence with the subclip of the synthesized audio recording spans at least one event more than the duration of the given subclip of the synthesized audio recording. The plurality of events comprises a series of successive beats in the digital musical score. The plurality of events comprises a series of successive notes in the digital musical score. The comparing step comprises performing a cross-correlation between the audio waveform of the subclip of the synthesized audio rendering and the subclip of the alternate audio rendering; and the temporal offset for which the audio waveform of the subclip of the alternate audio rendering is in optimal temporal alignment with the waveform of the subclip of the synthesized audio rendering corresponds to a maximum value of the cross-correlation. The comparing step comprises detecting and aligning occurrences of beats in the audio waveform of the subclip of the synthesized audio rendering and the subclip of the alternate audio rendering. An offset of a subclip of the alternate audio rendering generated for a given event starts at an offset in the alternate audio rendering corresponding to the identified temporal offset of an event immediately preceding the given event. For each event of the plurality of events, determining a confidence score for the identified temporal offset for the occurrence of the event in the alternate audio rendering. Flagging events for which the confidence score is less than a threshold confidence level, and outputting information that identifies the flagged events. Automatically displaying a new page of the digital musical score when an event at or near an end of a displayed page of the digital musical score is played back.

Generating a second version of the synthesized audio rendering, wherein an occurrence of each event in the second version of the synthesized audio rendering is retimed to occur at the temporal offset for the occurrence of the event in the alternate audio rendering. The digital musical score includes a first part for a first instrument and a second part for a second instrument and the synthesized audio rendering is a rendering of the first part, further comprising: generating a second synthesized audio rendering that is a rendering of both the first part and the second part, wherein an occurrence of each event of the plurality of events in the second synthesized audio rendering is retimed to occur in both the first part and the second part at the temporal offset for the occurrence of the event in the alternate audio rendering.

In general, in another aspect, a system comprises: a memory for storing computer-readable instructions; and a processor connected to the memory, wherein the processor, when executing the computer-readable instructions, causes the system to perform a method of displaying a playback location within a graphical representation of a digital musical score in synchrony with playback of an alternate audio rendering of the digital musical score, wherein the digital musical score comprises a plurality of events, and a temporal offset for an occurrence of each of the plurality of events in the alternate audio rendering diverges from a nominal temporal offset for an occurrence of the event as specified in the digital musical score, the method comprising: receiving a synthesized audio rendering of the digital musical score, wherein the synthesized audio rendering is generated automatically by parsing the digital musical score; receiving the alternate audio rendering of the digital musical score; for each event of the plurality of events: generating a subclip of the synthesized audio rendering starting at the event; generating a subclip of the alternate audio rendering that is in approximate temporal correspondence with the subclip of the synthesized audio recording; determining an adjusted temporal offset of the subclip of the synthesized audio for which a cross-correlation between the subclip of the synthesized audio rendering and the subclip of the alternate audio rendering is maximized; identifying the adjusted temporal offset as a temporal offset for the occurrence of the event in the alternate audio rendering; and displaying playback location within the graphical representation of the digital musical score in synchrony with playback of the alternate audio rendering of the digital musical score by displaying for each event of the plurality of events a graphical indication of a playback location of the event on a display of the graphical representation of the digital musical score at a playback time corresponding to the identified temporal offset for the occurrence of the event in the alternate audio rendering.

In general, in a further aspect, a computer program product comprises: a non-transitory computer-readable medium with computer program instructions encoded thereon, wherein the computer program instructions, when processed by a computer system instruct the computer system to perform a method of displaying a playback location within a graphical representation of a digital musical score in synchrony with playback of an alternate audio rendering of the digital musical score, wherein the digital musical score comprises a plurality of events, and a temporal offset for an occurrence of each of the plurality of events in the alternate audio rendering diverges from a nominal temporal offset for an occurrence of the event as specified in the digital musical score, the method comprising: receiving a synthesized audio rendering of the digital musical score, wherein the synthesized audio rendering is generated automatically by parsing the digital musical score; receiving the alternate audio rendering of the digital musical score; for each event of the plurality of events: generating a subclip of the synthesized audio rendering starting at the event; generating a subclip of the alternate audio rendering that is in approximate temporal correspondence with the subclip of the synthesized audio recording; determining an adjusted temporal offset of the subclip of the synthesized audio for which a cross-correlation between the subclip of the synthesized audio rendering and the subclip of the alternate audio rendering is maximized; identifying the adjusted temporal offset as a temporal offset for the occurrence of the event in the alternate audio rendering; and enabling the display of playback location within the graphical representation of the digital musical score in synchrony with playback of the alternate audio rendering of the digital musical score by displaying for each event of the plurality of events a graphical indication of a playback location of the event on a display of the graphical representation of the digital musical score at a playback time corresponding to the identified temporal offset for the occurrence of the event in the alternate audio rendering.

In general, in yet another aspect, a method of displaying a playback location within a graphical representation of a digital musical score in synchrony with playback of a given audio rendering of the digital musical score, wherein the digital musical score comprises a plurality of events, and an occurrence of each of the plurality of events in the given audio rendering diverges from a nominal occurrence of the event as specified in the digital musical score, comprises: in response to receiving a request for synchronized playback of the digital score: retrieving from storage the digital score, the given audio rendering of the digital musical score, and a list of offsets within the given audio rendering for the occurrence of the plurality of events; rendering a graphical display of the digital score in synchrony with audio playback of the given audio rendering; and for each event of the plurality of events, superposing on the graphical display of the digital score a graphical indication of a playback location of the event at a playback time of the given audio rendering specified by an offset for the occurrence of the event in the list of offsets. In some embodiments, the given audio rendering of the digital musical score is one of a plurality of different renderings of the digital musical score, and for each of the plurality of different renderings of the digital musical score, the storage contains a list of offsets within the audio rendering for the occurrence of the plurality of events, and the request for synchronized playback of the digital score specifies that the given audio rendering of the digital musical score is to be played back in synchrony with the digital score.

In general, in yet a further aspect, a computer program product comprises: a non-transitory computer-readable medium with computer program instructions encoded thereon, wherein the computer program instructions, when processed by a computer system instruct the computer system to perform a method of displaying a playback location within a graphical representation of a digital musical score in synchrony with playback of a given audio rendering of the digital musical score, wherein the digital musical score comprises a plurality of events, and an occurrence of each of the plurality of events in the given audio rendering diverges from a nominal occurrence of the event as specified in the digital musical score, the method comprising: in response to receiving a request for synchronized playback of the digital score: retrieving from storage the digital score, the given audio rendering of the digital musical score, and a list of offsets within the given audio rendering for the occurrence of the plurality of events; rendering a graphical display of the digital score in synchrony with audio playback of the given audio rendering; and for each event of the plurality of events, superposing on the graphical display of the digital score a graphical indication of a playback location of the event at a playback time of the given audio rendering specified by an offset for the occurrence of the event in the list of offsets. In certain embodiments: the given audio rendering of the digital musical score is one of a plurality of different renderings of the digital musical score; for each of the plurality of different audio renderings of the digital musical score, the storage contains a list of offsets within the audio rendering for the occurrence of the plurality of events; and the request for synchronized playback of the digital score specifies that the given audio rendering of the digital musical score is to be played back in synchrony with the digital score.

In general, in a further aspect, a method of generating an alternate synthesized audio rendering of a digital musical score, wherein the digital musical score comprises a plurality of events, comprises: receiving a synthesized audio rendering of the digital musical score that is generated automatically by parsing the digital musical score, wherein a temporal offset of the occurrence of each event of the plurality of events in the synthesized audio rendering conforms to a temporal offset for the event specified by the digital musical score; receiving an alternate audio rendering of the digital musical score, wherein a temporal offset for an occurrence of each of the plurality of events in the alternate audio rendering diverges from a temporal offset for an occurrence of the event as specified in the digital musical score; for each event of the plurality of events: generating a subclip of the synthesized audio rendering starting at the event; generating a subclip of the alternate audio rendering that is in approximate temporal correspondence with the subclip of the synthesized audio recording; determining an adjusted temporal offset of the subclip of the synthesized audio for which a cross-correlation between the subclip of the synthesized audio rendering and the subclip of the alternate audio rendering is maximized; identifying the adjusted temporal offset as a temporal offset for the occurrence of the event in the alternate audio rendering; and generating the alternate synthesized audio rendering, wherein an occurrence of each event in the alternate synthesized audio rendering is re-timed to occur at the temporal offset for the occurrence of the event in the alternate audio rendering.

Various embodiments include one or more of the following features. The digital musical score includes a first part for a first instrument and a second part for a second instrument and wherein: the alternate audio rendering is a rendering of the first part; and the alternate synthesized audio rendering is a rendering of both the first part and the second part, wherein an occurrence of each event of the plurality of events in the alternate synthesized audio rendering is re-timed to occur in both the first part and the second part at the temporal offset for the occurrence of the event in the alternate audio rendering. Applying dynamics of the alternate audio rendering corresponding to each event of the plurality of events to the alternate synthesized audio rendering at the temporal offset for the occurrence of the event in the alternate audio rendering.

BRIEF DESCRIPTION OF THE DRAWINGS

FIGS. 2A, 2B, and 2C are diagrammatic illustrations of a process for matching audio waveforms of successive subclips of an alternate audio rendering of a digital musical score with corresponding subclips of a synthesized audio rendering synthesized generated directly from the score.

DETAILED DESCRIPTION

Figure 1:
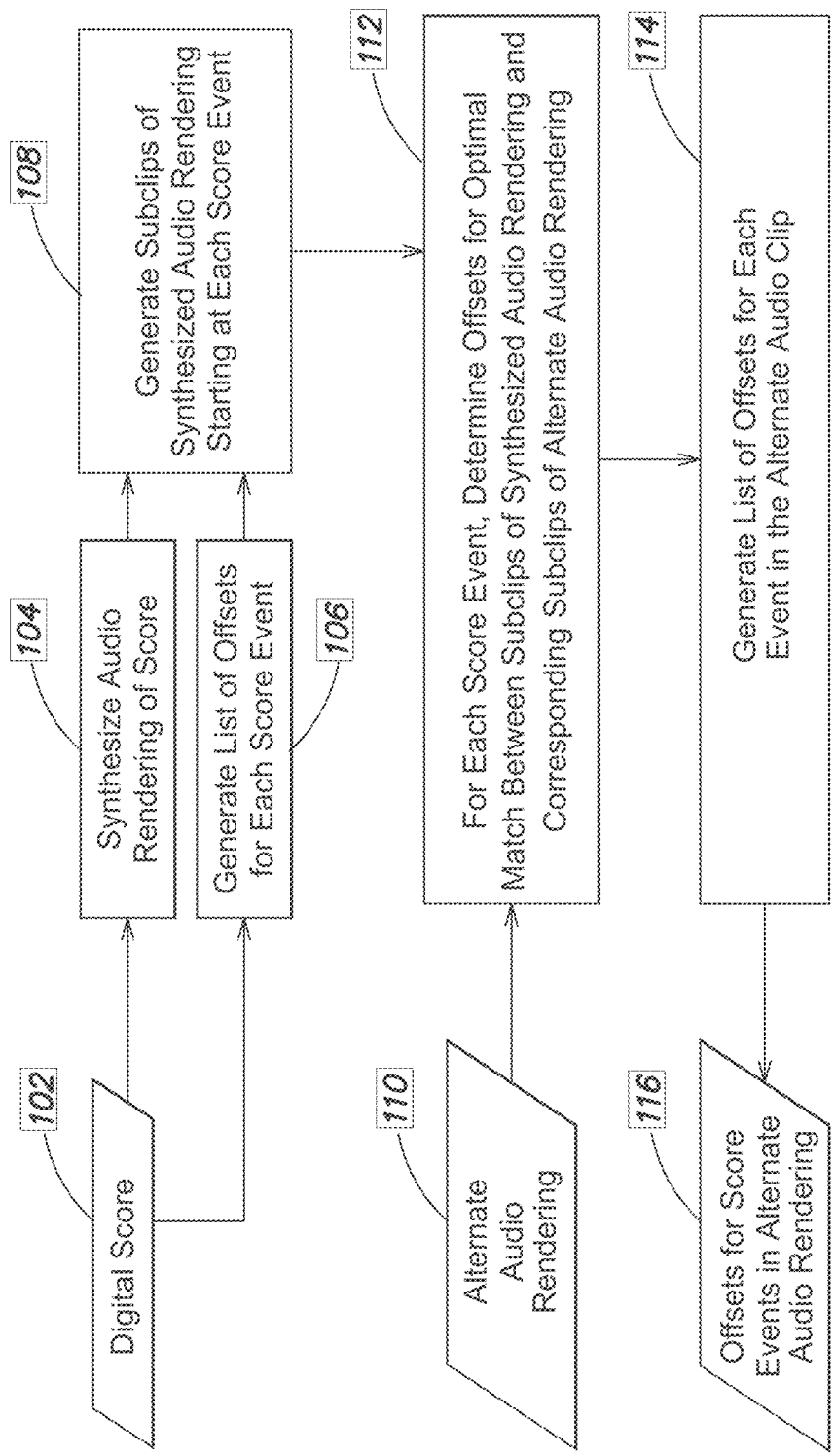
FIG. 1 is a high-level flow diagram of the steps involved in generating a list of temporal offsets for the occurrence of digital score events in an alternate audio rendering of the score.

Music notation applications, such as Sibelius® from Avid® Technology, Inc., of Burlington Mass., enable composers to create a digital musical score. The digital score includes data corresponding to each element of the score, including tempo, key signature, notes, dynamics, and so on. Each time-dependent element of the score is represented as an event. An event may correspond to each note or rest in the score, or to each beat, or to the first beat in each measure. The music notation application is able to determine the temporal offset from the beginning of the score of each score event. When a user requests playback of a score, a synthesized audio rendition of the score is generated on the fly as the application proceeds through the score's list of events, and is output to a speaker, headphones, or other audio output device. At the same time, the application displays a graphical representation of the score, and superposes onto the score representation a playback line that appears at successive event locations within the score at the time that the event is reached in the playback of the synthesized audio score rendition. In other words, the playback line moves through the score in synchrony with the audio playback.

The application determines which of a score's complete list of events is to be used as an event that is suitable for displaying the location of the playback line. The determination is based on the nature of the music being rendered, and the specific notes, rests and other score items that appear within each measure. Generally, each note is considered a suitable event for which a playback line is to be shown. If a note spans several beats, each of the beats may be deemed suitable events, and conversely, for rapid notes for which there are many notes per beat, events may be deemed suitable only at each beat rather than at each note.

The music notation application uses the temporal offset of each suitable event to display the playback line at the location within the displayed score corresponding to the currently playing event. This can be done both for fixed tempi and for tempi that vary through the course of the playback since the application has access to the required playback timing information keyed to the score.

As indicated above, it is desirable to perform synchronized playback of the score with a performance other than the one synthesized automatically from the score. Such alternate audio renderings of the score may have more expression, use varied instrumentations, and introduce artistic choices that bring the music to life. In general, alternate renderings involve a human performance of the work, either directly recorded from a live performance, or mixed by a digital audio workstation, such as Pro Tools® from Avid Technology, Inc. The expressiveness of such recordings stems, in part, from expressive, often subtle tempo changes throughout the course of the performance. Such changes are not reflected in the digital score, and thus the score notation program is not able to rely on the score to play back an alternate rendering while maintaining the temporal synchrony with the music. Without a mapping from the temporal offset of event locations in the score to the temporal locations in the alternate rendering where the corresponding events occur, the playback line loses synchrony with the audio.

We describe herein automatic methods of generating a mapping of the temporal offset of event locations in the score to the temporal locations in the alternate rendering where the events occur. By using this mapping instead of the computed nominal event timing derived from the score, the music notation program is able to display the playback line in proper synchrony with playback of the alternate audio rendering.

FIG. 1 is a high-level flow diagram illustrating the steps involved. The process starts with digital score 102, which has been created by a composer using a music notation software application or has been retrieved from a library of scores. An audio rendering of the score is synthesized (104) using instrument samples from a library of samples provided with the music notation software application or obtained from a sample library. It may also be generated from general MIDI and synthesized algorithmically via, e.g., FM synthesis or analog synthesis. The digital score also provides the information from which a list of temporal offsets is generated for each score event (106). The synthesized audio rendering of the score is then subdivided into short subclips that begin at each of the score events (108) with each subclip having a duration that spans approximately 4 successive events. Next, for each of the subclips of the synthesized audio rendering, an adjusted offset of the subclip that provides an optimal temporal match between the synthesized audio subclip and a corresponding subclip of alternate audio rendering 110 is determined (112). This process is described in detail below. When optimally matched, the offset of the synthesized audio subclip starting at a given score event is identified as the offset for the given event in the alternate audio rendering. Walking through each event of the synthesized audio rendering in this manner generates (114) list of the offsets 116 for the time when each score event occurs in alternate audio rendering 110. Music score viewing and playback software is then able to refer to the alternate list of offsets instead of the nominal score-derived offsets to display the playback line or other graphical indication of playback location on a graphical display of the score in synchrony with the audio playback of the alternate audio rendering. The display of the playback location may jump from event to event or may move continuously over the score display with or without pausing at the event locations where the playback location is synchronized with the audio rendering.

In various embodiments, the graphical indication of current playback position in the score is shown by highlighting a score element corresponding to the currently reached event, for example using color, font style, or animation.

Figure 2A:
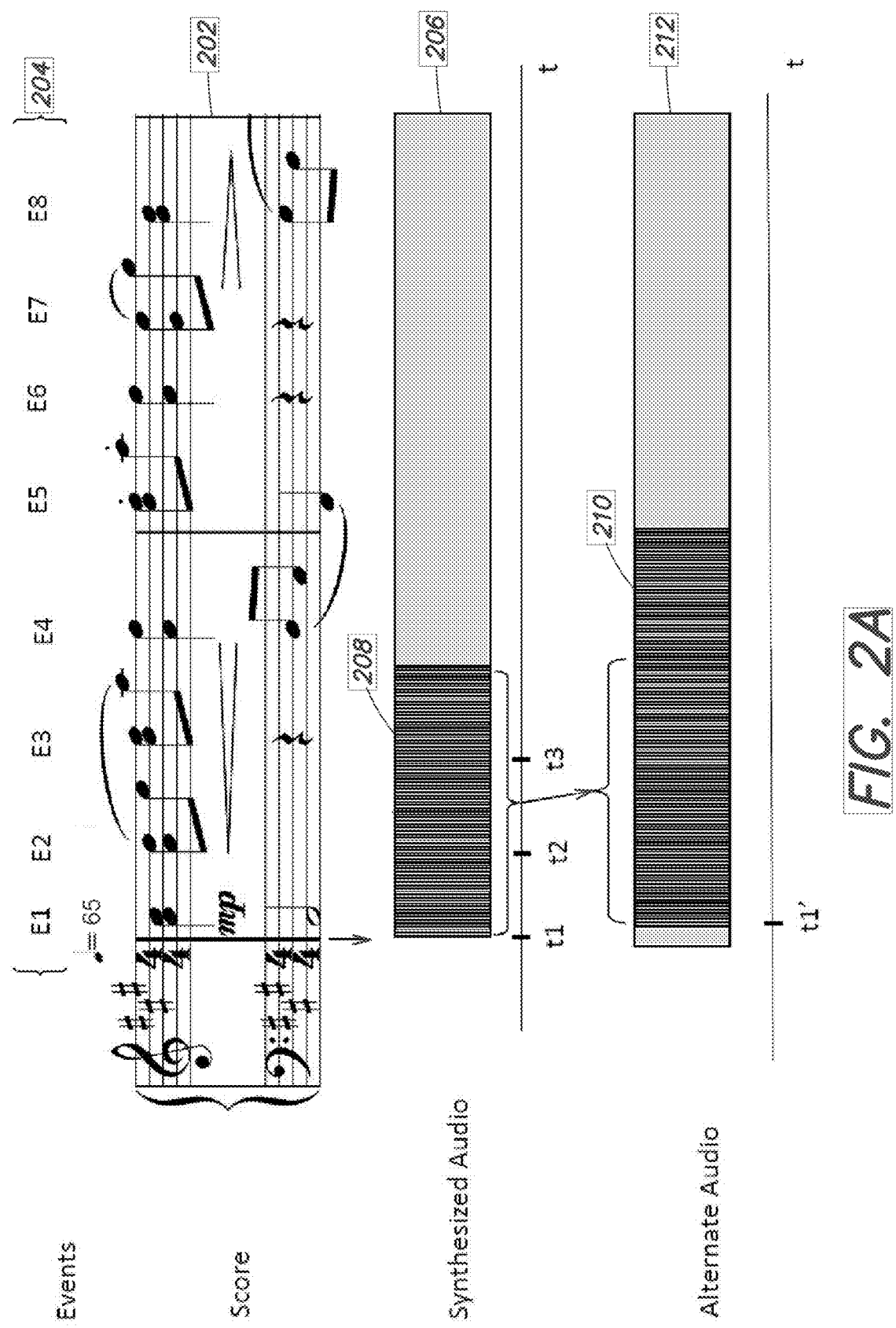
Figure 2B:

FIGS. 2A, 2B, and 2C are diagrammatic illustrations of the process for determining the temporal match between the first, second, and third subclips of a synthesized audio rendering and their corresponding subclips in an alternate audio rendering of a digital score. FIG. 2A shows the step of determining alternate offset $t1'$ corresponding to event E1 in a digital score. The figure shows graphical rendering 202 of the first two measures of the digital score, as well as an indication of the temporal location of each score event, E1, E2, . . . (204). In the example illustrated, the events correspond to the beats, with four beats in each measure. Synthesized audio rendering 206 is diagrammatically indicated in the figure as an audio waveform (shown as hatched shading) in a timeline format. Subclip 208 of synthesized audio rendering 206 begins at time $t1$, which is the nominal score-derived time offset of event E1 and has a duration of three events. Since it is at the start of the score, subclip 210 of alternate audio rendering 212 (also diagrammatically shown as an audio waveform) also begins at a temporal offset of $t1$, i.e., the nominal temporal offset of event E1. Subclip 210 has a duration that is somewhat longer than the duration of its corresponding synthesized audio subclip 208 in order to accommodate a potentially slower tempo in the alternate subclip. The excess duration of clip 210 as compared to clip 208 may be set as an absolute time such as one second, or as a percentage of the subclip length, and may be based in part on the type of music represented by the score. For music that lends itself to expressive renderings with significant artistic tempo changes, longer excess durations are used, and conversely, shorter excess durations may be used for music that is expected to adhere more closely to the score-specified tempo.

The offset $t1'$ of alternate audio subclip 210 for which the match with synthesized audio 206 is optimal is then determined. Several methods of comparing the two subclips to determine how well they match as a function of the alternate audio offset may be used. In one method, the optimal match is determined by running a cross-correlation between the two subclips and identifying $t1'$ as the offset of subclip 210 for which the correlation of the two signals is maximized. An alternative method uses beat detection to find offsets corresponding to an optimal match between the subclips. Yet another technique involves performing a spectral analysis of the subclips and using spectral signatures as a function of time to determine an optimal alignment. In various embodiments, a combination of matching methods may be used. The choice of matching method may be based in part on the nature of the music represented by the score, as well as by the instrumentation that was used to render the synthesized score and create the alternate audio.

FIG. 2A illustrates the matching of the first pair of subclips corresponding to the first event of the score, i.e., E1. In this special case, $t1=0$, and subclip 210 starts at the beginning of alternate audio rendering 212. If the start of alternate audio rendering 212 starts exactly at E1, then the matching process is likely to result in an optimal match when $t1'=0$. However, even the beginning of an alternate audio may be delayed with respect to E1 as a result of an artistic preference, and thus, in general, $t1' \neq t1$, as indicated in FIG. 2A.

Once the offset of alternate audio subclip 210, which corresponds to event E1, has been determined, the method is repeated to determine the alternate audio offset for the next event, i.e., E2, as shown in FIG. 2B. Event E2 corresponds to the score-derived offset $t2$, and accordingly subclip 214 of the synthesized audio rendering that corresponds to event E2 starts at offset $t2$. This subclip is matched against subclip 216 of the alternate audio rendering which starts at the previously determined best-matching offset $t1'$. An extra duration is added to the alternate rendering subclip to cover potential tempo changes in the alternate audio rendering, as discussed above, and to ensure that the alternate rendering subclip more than spans the time span of the corresponding synthesized audio subclip. The best temporal match is determined, and a second alternate offset $t2'$ corresponding to event E2 is obtained. FIG. 2C illustrates the matching for the third subclip 218 of the synthesized rendering with the corresponding subclip 220 of the alternate audio, and the third event offset $t3'$ in the alternate audio is determined. The process is repeated for successive events and their corresponding subclips until the end of the score is reached.

Various considerations are used to determine the length of the subclips. The amount of signal processing involved in the subclip matching increases with subclip duration, favoring shorter subclips. However, the shorter the subclip, the more likely it becomes that a spurious match will be found, for example if the synthesized subclip is reduced to a single note or short phrase that is repeated within the alternate audio subclip to which it is being matched. The chance of a mistaken match also increases if the extra duration added to the alternate rendering subclip to accommodate local tempo changes increases beyond a small number of seconds. In this case, the chance of a musical figure in the synthesized clip being found more than once in a repeated part of the score becomes significant. The confidence level of the match may decrease with decreasing subclip length. The selection of subclip duration may be based in part on the musical style represented by the score, e.g., classical, jazz, rock. The style may be determined by the score synchronizing software either from a metadata field of the score, or by using artificial intelligence methods to determine musical style automatically. In various implementations, the length of the subclips spans between 2 and 10 score events.

A confidence score of some or all the offsets determined for score events in the alternate audio rendering may be useful, especially for music in which there is a higher probability of matching errors occurring. A confidence score may be obtained from the peak value of a normalized cross-correlation. To obtain a normalized cross-correlation, the duration of the two subclips being compared must be the same. The alignment method described above uses cross-correlation on subclips of different duration. Once the alignment is found, a second normalized cross-correlation may be performed on the two aligned subclips by reducing the longer subclip of the two to the duration of the shorter subclip. When the confidence score for a given event offset or group of event offsets falls below a threshold level, the events are flagged. The threshold confidence level may be a predetermined default value or it may be specified by a user. The score synchronization software may automatically adjust the default value of the threshold based on the type of music involved or on the results of machine learning on a corpus correctly matched to their alternate audio renderings. The flagged events may then be checked, and, if necessary, corrected manually. In another approach, subclips corresponding to the flagged events may be matched again using different parameters in order to attempt to obtain higher confidence scores and eliminate the need for manual review. The parameters involved may include one or more of the duration of the subclips, the instrumentation selected for the synthesized audio rendering, the volume of the synthesized recording relative to that of the corresponding portion of the alternate rendering, and the tempo and the key of the synthesized rendering. Alternatively, or if satisfactory confidence levels are still not obtained for the matching of a portion of the score-derived rendering to its alternate rendering, event offsets may be determined by interpolating between neighboring higher confidence event matches. In regions of an alternate rendering where the automated methods of determining score event offsets fail, the methods may be supplemented by manual intervention, i.e., by manually entering the event locations.

Beat detection methods may be used to determine the tempo of the alternate audio rendering. If this tempo differs significantly from the nominal score-derived tempo of the synthesized rendering, the tempo of the synthesized recording may be adjusted without a corresponding pitch change before the matching is performed. Similarly, if the alternate audio rendering is played in a different key from that of the digital score, the synthesized recording may be transposed before performing the matching.

In addition to identifying local tempo changes associated with an expressive alternate rendering of a score, the methods described herein may be used to determine an adjusted tempo for a whole section of a score, or for the entire score. If the new tempo is preferred, it may be used to modify the score to show the newly determined tempo instead of the originally specified tempo.

In an alternative method of obtaining mappings of event offsets in the score to the offsets of the occurrence of the corresponding event offsets in the alternate audio rendering, a mapping of a series of subclips starting at temporal locations defined by their temporal offset in the synthesized rendering rather than defined by the location of events is determined. This is obtained by performing a cross-correlation between two subclips of the same length. Subsequently, the alternate audio subclip offsets determined in this manner are retrofitted to the event offsets. For example, in one implementation the subclips have a duration of 3 seconds. The subclip of the synthesized audio starting at to is cross-correlated with a moving 3-second window of the alternate audio rendering, and the best alignment is determined, e.g., at the offset $t_0'$ corresponding to a peak in the cross-correlation. Next, a second 3-second subclip of the synthesized audio starting at $t_1$=0.25 seconds is cross-correlated with a moving 3 second window of the alternate audio rendering, and the best alignment is determined at an offset of $t_1'$. This yields a set of offsets $t_0'$, $t_1'$, $t_2'$, etc. for the location in the alternate audio rendering of the nominal score locations corresponding to offsets of 0, 0.25 s, 0.50 s, etc. The relationship of these temporal offsets to score events may then be determined by parsing the score to generate the list of offsets for score events in the alternate audio rendering. In this method, it is not necessary to determine the location of score events before performing the subclip alignment.

Figure 3:
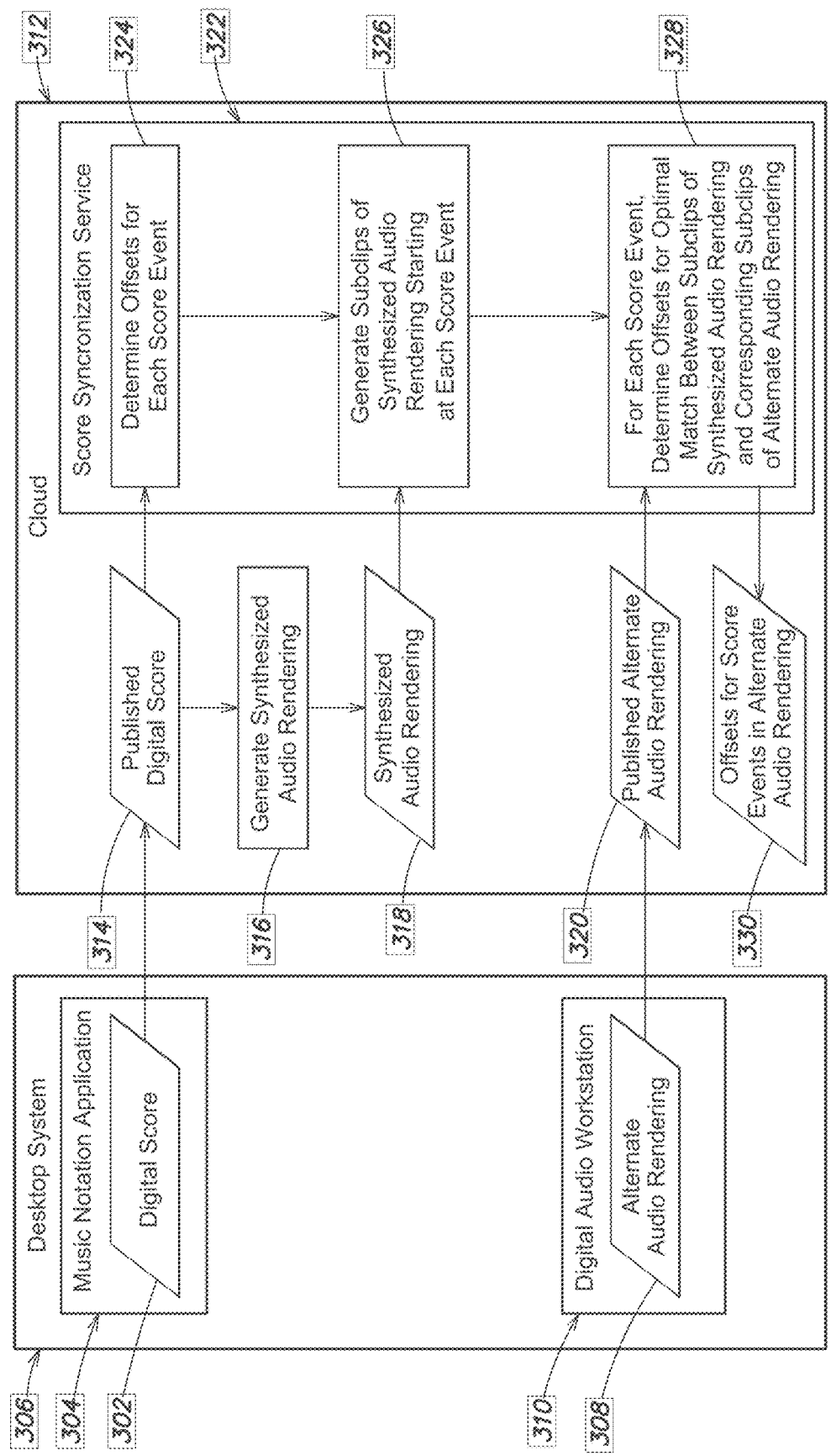
FIG. 3 is a high-level block diagram showing a system architecture for generating offsets for score events in an alternate audio rendering of a digital musical score.

A high-level block diagram of a system architecture for implementing the various steps of the score synchronizing methods described herein is shown in FIG. 3. Digital score 302 is created using music notation application 304 hosted on desktop system 306. Alternate audio rendering 308 is created and mixed using digital audio workstation 310, which in the illustrated embodiment is also hosted on desktop system 306. Alternatively, the digital audio workstation is hosted on another system, which may be remote from desktop system 306, or in the cloud. The alternate audio rendering may be created by the same person who created digital score 302 as when a composer performs their own composition. In other use cases, the alternate audio rendering has been previously created and is retrieved from storage.

When digital score 302 is to be published, it is uploaded to computing cloud 312 and stored as published version 314 of the digital score. A score rendering service parses the digital score and generates (step 316) synthesized audio rendering 318. Multi-instrument scores are commonly instrumented as a reduced version for piano, though other instrumentations may be chosen by the composer or the music publisher. When alternate audio rendering 308 of the score is to be published, it is uploaded to the cloud and stored as published version 320 of the alternate audio rendering. Score synchronization service 322 accesses published copy 314 of the digital score, accesses score metadata that specifies tempo, time signature, and event locations, and parses the score to determine the temporal offsets for each score event (step 324). The score synchronization service also accesses synthesized audio rendering 318 and breaks it down into a series of short subclips, with each successive subclip of the series starting at the offset corresponding to each successive score event (step 326). Then, the score synchronization service accesses published alternate audio rendering 320 and performs a series of comparisons between each of the subclips of the synthesized audio rendering generated in step 326 and portions of the alternate audio rendering that correspond approximately to the subclip, as described above (step 328). By walking through each of the events in sequence, list of offsets 330 for the occurrence of score events in published alternate audio rendering 320 is generated and stored in the cloud.

Figure 4:
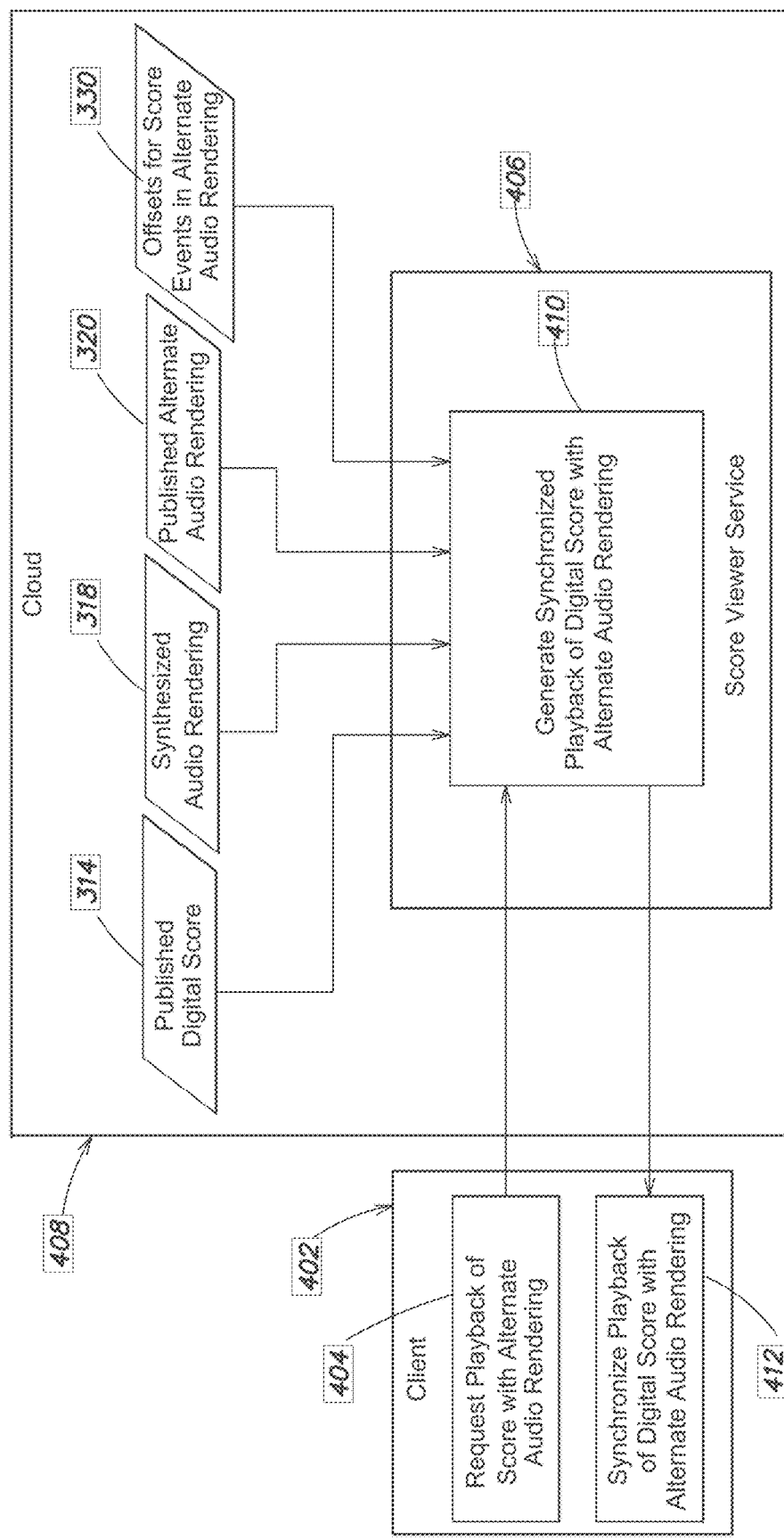
FIG. 4 is a high-level block diagram of a system for enabling a user of a client system to view playback of a digital score synchronized with playback of an alternate audio rendering of the score.

Once the set of offsets for the occurrence of events in a published alternate audio rendering of score has been determined, it is made available to a score viewer to enable playback of the score to be synchronized with the alternate audio, rather than just with the synthesized audio. FIG. 4 is a high-level block diagram of a system for enabling a user of a client system to view synchronized playback of a digital score with an alternate audio rendering of the score. A user of client system 402 enters request 404 for playback of a score with an alternate audio rendering. In one implementation, all user interaction takes place within a browser window on the client system. Request 404 is received by score viewer service 406 running in computing cloud 408. The viewer service accesses published digital score 314, synthesized audio rendering 318, published alternate audio rendering 320, and the offsets 330 for score events in the published alternate audio rendering and generates alternate synchronized playback 410. This includes generating the graphical representation of the published digital score, superposing an event-by-event indication of current playback location in accordance with offsets 330, while playing back the alternate audio rendering. The result is streamed to client 402 in response to request 404, where the user is able to view synchronized playback 412 of the digital score while listening to the alternate audio rendering. Synthesized audio rendering 318 may also be accessible to the score viewer service, as shown in FIG. 4, together with one or more additional alternate audio performances of the score (not shown). A set of score event offsets for each alternate audio version is generated by the score synchronization service using the methods described herein. These may be made available to the score viewer service, which may thus support the ability to offer a user a choice of multiple alternate renderings of the score, each with its unique expressive tempo variations, and each capable of being played back in correct synchronization with playback of the score.

In another implementation, the mapping of score events to the alternate audio rendering is used to re-time the playback of the synthesized score-derived audio recording to make it more expressive. The score is played with the synthesized sounds, but with performer-influenced tempo variations. Re-timed renderings of a score may not sound musically pleasing if the nominal tempo of the score is significantly different from that of the alternate audio rendering. One method of addressing this involves time-stretching the alternate audio rendering and determining whether the confidence score obtained in the subclip matching process is thereby improved. By performing such retiming for a range of time-stretches, e.g., from −5% to +5% in increments of 1%, an optimal confidence score is determined. The process may then be progressively refined by performing re-timing and matching over a narrower range of time-stretches using smaller increments centered on the previously determined optimal time-stretch. The time-stretching and matching may be performed for each section or sub-section of a composition, with the time-stretch that yields the best match indicating the best tempo match for that section or sub-section.

Using timing metadata from an expressive performance to re-time playback of a score-derived synthesized rendering may be especially valuable when the expressive audio rendering results from a performer who frequently makes mistakes by playing incorrect notes, or in the case where a cleaner rendering of the music (e.g., without the background noise of a live recording) can be made from the synthesized playback. The temporal metadata capturing the performer's tempo as represented by the mapping of beats or score events may be applied to high quality samples supplied by the score notation software adhering to the correct notes, which are determined by the score. The ability to retime the playback of a score using an event mapping derived from an expressive audio rendering may also be useful when playing back a score of an arrangement for multiple instruments to accompany a piano, or other recording of a score. A composer creates a score of the entire composition but replaces one or more of the synthesized instruments with an alternate audio recording. The adjusted timing of the alternate recording may then be used to combine the alternate audio recording with the parts rendered by synthesis from the score so that all parts are in synchrony with the expressive tempo derived from the alternate recording. The score playback may then constitute playback of the alternate recording for the one or more parts of the score that it renders, together with synthesized renderings of the remaining score parts. Alternatively, the one or more parts performed by the alternate recording may also be synthesized so that all the score parts are played back in the expressive tempo with synthesized instruments.

For example, a composer may create a score for a string arrangement to accompany a live piano recording. The expressive tempo variations of the live piano recording are captured and the synchronized score playback of both the piano part as well as the string arrangement is played back following the new tempo map of the expressive piano recording. Without the ability to apply the newly derived tempo map to the additional parts, it would not, in general, be possible to listen to a non-metronomic playback of the combined score.

In various implementations, the playback of a digital score using the expressive tempo of an alternate rendering obtained from using the described matching methods may occur without also displaying the synchronized graphical rendering of the score with a superposed indication of current playback location. The list of alternate offsets is used to synchronize playback of the various parts of a score, some of which may be taken from the alternate rendering, with the rest being synthesized (and re-timed) from the score.

Once the expressive tempo of the alternate rendering has been captured and used to enable synchronization of a synthesized rendering with the expressive tempo of the alternate rendering, the expressive dynamics of the alternate rendering may also be captured and applied to the synthesized rendering to transfer to it expressive dynamics in addition to expressive timing.

During synchronized playback of a score, the score viewer service may enable the requester of the synchronized score playback to pause or to jump forward or backward to any location in the score. It may also offer the requester the ability to specify the nominal playback tempo, i.e., the tempo assigned to the time signature of the score. To maintain synchrony, the speed of playback of the audio rendering is scaled without pitch change by the ratio of the specified tempo to the original tempo.

A score presentation application may use the methods described herein to "listen" for a musical signature that occurs at or near the end of a page of a score and turn the score page automatically. The score presentation application produces a synthetic rendering of a performance, and using real-time processing, compares it to a live rendering. By performing a matching on each subclip, the application identifies the performer's location within the score, and uses that information to turn the page at the appropriate location.

In another application of the described methods, a performer pre-records a musical signature corresponding to the location in the performance when an event is to be triggered. By comparing in real-time the waveform from a subsequent live performance with a rendering of the pre-recorded signature, the application triggers the event when it identifies a match, e.g., by a spike in the cross-correlation, between a performed sub-clip and the pre-recorded signature. Examples of use cases include freeing a guitarist from the need to use an effects pedal to trigger an effect such as a distortion or reverb, or for an organist to change stops.

In various embodiments, the execution of the various aspects of the described score synchronizing methods takes place on multiple client systems, optionally using shared local storage, or on dedicated servers, either co-located with one of more of the client systems, or remotely located and in data communication with the client systems via a wide area network. The functions shown as taking place in cloud 312 may be performed on a desktop system, such as a system used by a composer or a music publisher. This system may service the synchronized playback requests (FIG. 4, 404), or the required assets (314, 318, 320) and the derived alternate offsets (330) may be uploaded to a remote server or cloud resource from the desktop system in order enable the score viewing service to be fulfilled remotely, as shown in implementation of FIG. 4.

The various components of the system described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, various stereoscopic displays including displays requiring viewer glasses and glasses-free displays, cathode ray tubes, video projection systems and other video output devices, printers, devices for communicating over a low or high bandwidth network, including network interface devices, cable modems, and storage devices such as disk or tape. One or more input devices may be connected to the computer system. Example input devices include, but are not limited to, a keyboard, keypad, track ball, mouse, pen and tablet, touchscreen, camera, communication device, and data input devices. The invention is not limited to the particular input or output devices used in combination with the computer system or to those described herein.

The computer system may be a general-purpose computer system, which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic, optical, or solid-state drives, which may include an array of local or network attached disks.

A system such as described herein may be implemented in software, hardware, firmware, or a combination of the three. The various elements of the system, either individually or in combination may be implemented as one or more computer program products in which computer program instructions are stored on a non-transitory computer readable medium for execution by a computer or transferred to a computer system via a connected local area or wide area network. Various steps of a process may be performed by a computer executing such computer program instructions. The computer system may be a multiprocessor computer system or may include multiple computers connected over a computer network or may be implemented in the cloud. The components described herein may be separate modules of a computer program, or may be separate computer programs, which may be operable on separate computers. The data produced by these components may be stored in a memory system or transmitted between computer systems by means of various communication media such as carrier signals.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of enabling a display of playback location within a graphical representation of a digital musical score in synchrony with playback of an alternate audio rendering of the digital musical score, wherein the digital musical score comprises a plurality of events, and a temporal offset for an occurrence of each of the plurality of events in the alternate audio rendering diverges from a nominal temporal offset for an occurrence of the event as specified in the digital musical score, the method comprising:

receiving a synthesized audio rendering of the digital musical score, wherein the synthesized audio rendering is generated automatically by parsing the digital musical score;

receiving the alternate audio rendering of the digital musical score;

for each event of the plurality of events:

generating a subclip of the synthesized audio rendering starting at the event;

generating a subclip of the alternate audio rendering that is in approximate temporal correspondence with the subclip of the synthesized audio recording;

determining an adjusted temporal offset of the subclip of the synthesized audio for which a quality of match between the subclip of the synthesized audio rendering and the subclip of the alternate audio rendering is maximized;

identifying the adjusted temporal offset as a temporal offset for the occurrence of the event in the alternate audio rendering; and in response to a request for synchronized playback of the alternate audio rendering with the digital score, displaying for each event of the plurality of events a graphical indication of a playback location of the event on a display of the graphical representation of the digital musical score at a playback time corresponding to the identified temporal offset for the occurrence of the event in the alternate audio rendering.

2. The method of claim 1, wherein the alternate audio rendering comprises a human performance of the digital musical score.

3. The method of claim 1, wherein a duration of a given subclip of the synthesized audio rendering spans more than one event of the plurality of events and less than ten events of the plurality of events.

4. The method of claim 3, wherein the duration of each subclip of the alternate audio rendering that is in approximate temporal correspondence with the subclip of the synthesized audio recording spans at least one event more than the duration of the given subclip of the synthesized audio recording.

5. The method of claim 1, wherein the plurality of events comprises a series of successive beats in the digital musical score.

6. The method of claim 1, wherein the plurality of events comprises a series of successive notes in the digital musical score.

7. The method of claim 1 wherein:
the quality of match between the subclip of the synthesized audio rendering and the subclip of the alternate audio rendering is determined by performing a cross-correlation between the subclip of the synthesized audio rendering and the subclip of the alternate audio rendering; and
the adjusted temporal offset corresponds to a temporal offset for which the cross correlation is maximized.

8. The method of claim 1 wherein the quality of match between the subclip of the synthesized audio rendering and the subclip of the alternate audio rendering is determined by detecting occurrences of beats in the subclip of the synthesized audio rendering and in the subclip of the alternate audio rendering; and
the adjusted temporal offset corresponds to a temporal offset for which an alignment between the detected occurrences of beats in the subclip of the synthesized audio recording and the occurrences of beats in the subclip of the alternate audio rendering is optimized.

9. The method of claim 1, wherein an offset of a subclip of the alternate audio rendering generated for a given event starts at an offset in the alternate audio rendering corresponding to the identified temporal offset of an event immediately preceding the given event.

10. The method of claim 1 further comprising, for each event of the plurality of events, determining a confidence score for the identified temporal offset for the occurrence of the event in the alternate audio rendering.

11. The method of claim 10 further comprising flagging events for which the confidence score is less than a threshold confidence level, and outputting information that identifies the flagged events.

12. The method of claim 1, further comprising automatically displaying a new page of the digital musical score when an event at or near an end of a displayed page of the digital musical score is played back.

13. A computer program product comprising:
a non-transitory computer-readable medium with computer program instructions encoded thereon, wherein the computer program instructions, when processed by a computer system instruct the computer system to perform a method of displaying a playback location within a graphical representation of a digital musical score in synchrony with playback of an alternate audio rendering of the digital musical score, wherein the digital musical score comprises a plurality of events, and a temporal offset for an occurrence of each of the plurality of events in the alternate audio rendering diverges from a nominal temporal offset for an occurrence of the event as specified in the digital musical score, the method comprising:
receiving a synthesized audio rendering of the digital musical score, wherein the synthesized audio rendering is generated automatically by parsing the digital musical score;
receiving the alternate audio rendering of the digital musical score;
for each event of the plurality of events:
generating a subclip of the synthesized audio rendering starting at the event;
generating a subclip of the alternate audio rendering that is in approximate temporal correspondence with the subclip of the synthesized audio recording;
determining an adjusted temporal offset of the subclip of the synthesized audio for which a quality of match between the subclip of the synthesized audio rendering and the subclip of the alternate audio rendering is maximized;
identifying the adjusted temporal offset as a temporal offset for the occurrence of the event in the alternate audio rendering; and
in response to a request for synchronized playback of the alternate audio rendering with the digital score, displaying for each event of the plurality of events a graphical indication of a playback location of the event on a display of the graphical representation of the digital musical score at a playback time corresponding to the identified temporal offset for the occurrence of the event in the alternate audio rendering.

14. A method of displaying a playback location within a graphical representation of a digital musical score in synchrony with playback of a specified audio rendering of a plurality of different audio renderings of the digital musical score, wherein the digital musical score comprises a plurality of events, and an occurrence of each of the plurality of events in the specified audio rendering diverges from a nominal occurrence of the event as specified in the digital musical score, the method comprising:
in response to receiving a request for synchronized playback of the digital score with the specified audio rendering:
retrieving from storage the digital score, the specified audio rendering of the digital musical score, and a list of offsets within the specified audio rendering for the occurrence of the plurality of events, wherein the storage includes a list of offsets for the plurality of events within each of the plurality of different audio renderings of the digital musical score;
rendering a graphical display of the digital score in synchrony with audio playback of the given audio rendering; and for each event of the plurality of events, superposing on the graphical display of the digital score a graphical indication of a playback location of the event at a playback time of the specified audio rendering specified by an offset for the occurrence of the event in the list of offsets.

15. A computer program product comprising:
a non-transitory computer-readable medium with computer program instructions encoded thereon, wherein the computer program instructions, when processed by a computer system instruct the computer system to perform a method of displaying a playback location within a graphical representation of a digital musical score in synchrony with playback of a specified audio rendering of a plurality of different audio renderings of the digital musical score, wherein the digital musical score comprises a plurality of events, and an occurrence of each of the plurality of events in the specified audio rendering diverges from a nominal occurrence of the event as specified in the digital musical score, the method comprising:
    in response to receiving a request for synchronized playback of the digital score with the specified audio rendering:
        retrieving from storage the digital score, the specified audio rendering of the digital musical score, and a list of offsets within the specified audio rendering for the occurrence of the plurality of events, wherein the storage includes a list of offsets for the plurality of events within each of the plurality of different audio renderings of the digital musical score;
        rendering a graphical display of the digital score in synchrony with audio playback of the given audio rendering; and
        for each event of the plurality of events, superposing on the graphical display of the digital score a graphical indication of a playback location of the event at a playback time of the specified audio rendering specified by an offset for the occurrence of the event in the list of offsets.

16. A method of enabling a display of playback location within a graphical representation of a digital musical score in synchrony with playback of an alternate audio rendering of the digital musical score, wherein the digital musical score comprises a plurality of events, and a temporal offset for an occurrence of each of the plurality of events in the alternate audio rendering diverges from a nominal temporal offset for an occurrence of the event as specified in the digital musical score, the method comprising:
    receiving a synthesized audio rendering of the digital musical score, wherein the synthesized audio rendering is generated automatically by parsing the digital musical score;
    receiving the alternate audio rendering of the digital musical score;
    for each initial temporal offset in the synthesized audio rendering of a plurality of initial temporal offsets in the synthesized audio rendering:
        generating a subclip of the synthesized audio rendering starting at the initial temporal offset and having a given duration;
        performing a cross-correlation of an audio waveform of the subclip with a moving window of the given duration of an audio waveform of the alternate audio rendering to determine an adjusted temporal offset of a subclip of the alternate audio rendering of the given duration for which the cross-correlation is maximized; and
        identifying the adjusted temporal offset as a temporal offset in the alternate audio rendering of the initial temporal offset;
    parsing the digital score to determine a temporal relationship between each of the initial temporal offsets and the plurality of score events to generate a list of offsets within the given audio rendering for the occurrence of the plurality of events; and
    in response to a request for synchronized playback of the alternate audio rendering with the digital score, displaying for each event of the plurality of events a graphical indication of a playback location of the event on a display of the graphical representation of the digital musical score at a playback time corresponding to the identified temporal offset for the occurrence of the event in the alternate audio rendering.

17. A method of generating an alternate synthesized audio rendering of a digital musical score, wherein the digital musical score comprises a plurality of events, the method comprising:
    receiving a synthesized audio rendering of the digital musical score that is generated automatically by parsing the digital musical score, wherein a temporal offset of the occurrence of each event of the plurality of events in the synthesized audio rendering conforms to a temporal offset for the event specified by the digital musical score;
    receiving an alternate audio rendering of the digital musical score, wherein a temporal offset for an occurrence of each of the plurality of events in the alternate audio rendering diverges from a temporal offset for an occurrence of the event as specified in the digital musical score;
    for each event of the plurality of events:
        generating a subclip of the synthesized audio rendering starting at the event;
        generating a subclip of the alternate audio rendering that is in approximate temporal correspondence with the subclip of the synthesized audio recording;
        determining an adjusted temporal offset of the subclip of the synthesized audio for which a cross-correlation between the subclip of the synthesized audio rendering and the subclip of the alternate audio rendering is maximized;
        identifying the adjusted temporal offset as a temporal offset for the occurrence of the event in the alternate audio rendering; and
    generating the alternate synthesized audio rendering, wherein an occurrence of each event in the alternate synthesized audio rendering is re-timed to occur at the temporal offset for the occurrence of the event in the alternate audio rendering.

18. The method of claim 17, wherein the digital musical score includes a first part for a first instrument and a second part for a second instrument and wherein:
    the alternate audio rendering is a rendering of the first part; and
    the alternate synthesized audio rendering is a rendering of both the first part and the second part, wherein an occurrence of each event of the plurality of events in the alternate synthesized audio rendering is re-timed to occur in both the first part and the second part at the temporal offset for the occurrence of the event in the alternate audio rendering.

19. The method of claim 17 further comprising applying dynamics of the alternate audio rendering corresponding to each event of the plurality of events to the alternate synthesized audio rendering at the temporal offset for the occurrence of the event in the alternate audio rendering.

\* \* \* \* \*